United States Patent
Hu

(10) Patent No.: US 10,061,425 B2
(45) Date of Patent: Aug. 28, 2018

(54) MULTI-FUNCTIONAL CAPACITIVE-IMAGE SENSING IN SAME PANEL

(71) Applicant: Touchplus Information Corp., New Taipei (TW)

(72) Inventor: Shih-Hsien Hu, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 190 days.

(21) Appl. No.: 15/040,206

(22) Filed: Feb. 10, 2016

(65) Prior Publication Data

US 2016/0239146 A1 Aug. 18, 2016

(30) Foreign Application Priority Data

Feb. 13, 2015 (TW) .............................. 104105100 A

(51) Int. Cl.
| G06F 3/044 | (2006.01) |
| G06F 3/041 | (2006.01) |
| G06F 3/0488 | (2013.01) |
| G06F 3/0354 | (2013.01) |
| G06K 9/00 | (2006.01) |

(52) U.S. Cl.
CPC ........ *G06F 3/0416* (2013.01); *G06F 3/03547* (2013.01); *G06F 3/044* (2013.01); *G06F 3/04883* (2013.01); *G06F 3/04886* (2013.01); *G06K 9/0002* (2013.01); *G06F 2203/04106* (2013.01)

(58) Field of Classification Search
CPC ...................................... G06F 3/044
See application file for complete search history.

(56) References Cited

U.S. PATENT DOCUMENTS

2013/0342498 A1* 12/2013 Kim .................. G06F 3/044
                                                         345/174
2014/0035865 A1   2/2014 Hu
2014/0097885 A1   4/2014 Hu
(Continued)

FOREIGN PATENT DOCUMENTS

| TW | 201407430 A | 2/2014 |
| TW | 201415334 A | 4/2014 |
| TW | 201443754 A | 11/2014 |

*Primary Examiner* — Sanghyuk Park
(74) *Attorney, Agent, or Firm* — WPAT, PC

(57) ABSTRACT

A capacitive-image sensing system for use in an information processing system. The information processing system comprises a sensing panel. The capacitive-image sensing system comprises: a first capacitive sensing device disposed in a first region of the sensing panel and having a first capacitive-image sensing characteristic; and a second capacitive sensing device disposed in a second region of the sensing panel and having a second capacitive-image sensing characteristic, wherein the second capacitive-image sensing characteristic is different from the first capacitive-image sensing characteristic. For example, the first capacitive-image sensing characteristic includes a first capacitive-image sensing resolution and/or a first capacitive-image sensing distance from a touch plane of the capacitive-image sensing system, and the second capacitive-image sensing characteristic includes a second capacitive-image sensing resolution and/or a second capacitive-image sensing distance from the touch plane of the capacitive-image sensing system.

21 Claims, 7 Drawing Sheets

(56) References Cited

U.S. PATENT DOCUMENTS

| | | | |
|---|---|---|---|
| 2014/0333575 A1 | 11/2014 | Hu | |
| 2014/0340343 A1* | 11/2014 | Han | G06F 3/0416 |
| | | | 345/173 |
| 2014/0347319 A1* | 11/2014 | Lin | G06F 3/044 |
| | | | 345/174 |
| 2015/0106759 A1* | 4/2015 | Ryo | G06F 1/1626 |
| | | | 715/781 |
| 2015/0109225 A1 | 4/2015 | Hu | |
| 2015/0127965 A1* | 5/2015 | Hong | H04L 9/3231 |
| | | | 713/323 |
| 2015/0227233 A1* | 8/2015 | Yi | G06F 3/044 |
| | | | 345/174 |
| 2016/0054827 A1* | 2/2016 | Mickelsen | G06F 3/044 |
| | | | 345/174 |

\* cited by examiner

MULTI-FUNCTIONAL CAPACITIVE-IMAGE SENSING IN SAME PANEL

FIELD OF THE INVENTION

The present invention relates to a capacitive-image sensing system, and more particularly to a multi-functional capacitive-image sensing system.

BACKGROUND OF THE INVENTION

With increasing development of touch-sensing technologies, touch sensing control becomes more and more popular in daily lives, and has more and more diverse applications. For example, touch sensing control can be applied to home appliances such as televisions and refrigerators, remote controllers, mobile devices, etc.

Conventional touch sensing techniques simply sense user's touch or gesture to locate a sensing site, so its applications are limited. It is desirable to create more diverse and more flexible applications of touch sensing control.

SUMMARY OF THE INVENTION

Therefore, the present invention provides a multi-functional capacitive-image sensing system, which makes use of touch sensing techniques to conduct a variety of sensing applications.

The present invention provides a capacitive-image sensing system for use in an information processing system. The information processing system comprises a sensing panel. The capacitive-image sensing system comprises: a first capacitive sensing device disposed in a first region of the sensing panel and having a first capacitive-image sensing characteristic; and a second capacitive sensing device disposed in a second region of the sensing panel and having a second capacitive-image sensing characteristic, wherein the second capacitive-image sensing characteristic is different from the first capacitive-image sensing characteristic.

For example, the first capacitive-image sensing characteristic includes a first capacitive-image sensing resolution, and the second capacitive-image sensing characteristic includes a second capacitive-image sensing resolution.

In another example, the first capacitive-image sensing characteristic includes a first capacitive-image sensing distance from a touch plane of the capacitive-image sensing system, and the second capacitive-image sensing characteristic includes a second capacitive-image sensing distance from the touch plane of the capacitive-image sensing system.

In a further example, the first capacitive-image sensing characteristic includes a first capacitive-image sensing resolution and a first capacitive-image sensing distance from a touch plane of the capacitive-image sensing system, and the second capacitive-image sensing characteristic is a second capacitive-image sensing resolution and a second capacitive-image sensing distance from the touch plane of the capacitive-image sensing system.

In an example, the first region and the second region do not overlap, and in another example, the first region and the second region partially or entirely overlap.

In an embodiment, the first capacitive sensing device includes a plurality of first electrodes, the second capacitive sensing device includes a plurality of second electrodes, and the first capacitive sensing device is disposed under the second capacitive sensing device, and wherein each of the second electrodes is disposed above one of the first electrodes without crossing any gap between the second electrodes. Preferably, a selected one of the first capacitive sensing device and the second capacitive sensing device is kept in a normal working state, and the other capacitive sensing device is switched from an OFF state into an ON state in response to a specific sensing operation of the selected capacitive sensing device. More preferably, the selected capacitive sensing device is the first capacitive sensing device and the other capacitive sensing device is the second capacitive sensing device, and wherein electrodes of the second capacitive sensing device are made floating in the sleep mode in order not to interfere with sensing operations of the first capacitive sensing device.

In an embodiment, the first capacitive sensing device is kept in a normal working state, and the second capacitive sensing device is switched from an OFF state into an ON state in response to a specific sensing operation of the first capacitive sensing device. Preferably, the first capacitive sensing device is a gesture sensor, and the second capacitive sensing device is a fingerprint detector.

In an embodiment, the first capacitive sensing device is driven with a first working voltage, and the second capacitive sensing device is driven with a second working voltage, which is unequal to the first working voltage.

In an embodiment, the capacitive-image sensing system further comprises at least one physical key, wherein the first capacitive sensing device is temporarily activated to execute a sensing operation in response to depression of the at least one physical key, and if a result of the sensing operation complies with a specific condition, the entire capacitive-image sensing system, the sensing panel and/or the information processing system is activated.

In an embodiment, the first capacitive sensing device is a gesture sensor, and the capacitive-image sensing system further comprises a control chip in communication with the gesture sensor, and wherein the control chip controls the information processing system to switch from a sleep mode to a normal working mode in response to a gesture detected by the gesture sensor. In a preferred embodiment, a message inputted by a user when the information processing system is in a sleep mode is received and stored by the control chip, and the control chip activates the information processing system to switch from the sleep mode to the normal working mode and transmits the message to the information processing system when a transmission condition is complied with, and the transmission condition, for example, is complied with when the gesture sensor detects a specific gesture. In another preferred embodiment, the capacitive-image sensing system further comprises additional gesture sensors, and each of the gesture sensors includes a touch sensing electrode portion for sensing a user's touch or gesture, and a near-field signal and power transmission electrode portion disposed at an edge thereof, wherein the gesture sensors execute signal transmission therebetween via respective near-field signal and power transmission electrode portions.

In an embodiment, the second capacitive sensing device is a fingerprint detector set consisting of a plurality of fingerprint detectors, and the capacitive-image sensing system further comprises a control chip in communication with the fingerprint detectors, wherein the fingerprint detectors are divisionally activated by the control chip according to a user's touch position on the fingerprint detectors.

BRIEF DESCRIPTION OF THE DRAWINGS

The invention will become more readily apparent to those ordinarily skilled in the art after reviewing the following detailed description and accompanying drawings.

DETAILED DESCRIPTION OF PREFERRED EMBODIMENTS

The invention hereinafter will be described in greater detail with preferred embodiments of the invention and accompanying illustrations. Nevertheless, it should be recognized that the preferred embodiments of the invention are not provided to limit the invention but to illustrate it. The present invention can be practiced not only in the preferred embodiments herein mentioned, but also in a wide range of other embodiments besides those explicitly described. Furthermore, the scope of the present invention is expressly not limited to any particular embodiments except what is specified in the appended Claims.

It is to be noted that the term "capacitive-image sensing" used hereinafter means the use of a matrix of capacitive sensing elements to detect capacitance and/or capacitance changes occurring in each of the capacitive sensing elements caused by a conductive object approaching the sensing matrix. The distribution of the detected capacitance and/or capacitance changes is recorded as a format of image, which is referred to as a capacitive image.

It is also to be noted that the term "touch sensitive", "touch sensing" or "gesture sensing" used hereinafter means not only to be sensitive to a sliding or touching gesture actually acting on a specified surface but also sensitive to an air gesture floatingly acting over the specified surface. The air gesture may be a vertically moving action and/or a horizontally moving action within a specified range, or a holding-still action for a specified period of time. Hereinafter, fingers are exemplified as the tool for executing the gestures. However, any other suitable tool capable of conducting a capacitance change may be used depending on practical requirements and size of the touch-sensing electronic device. For example, palms, soles or conductive objects may also be used instead. For large-area touch sensing, a plurality of touch sensing units may be combined to detect a capacitance change so as to effectively enhance the sensitivity and effective sensible distance.

Figure 1:
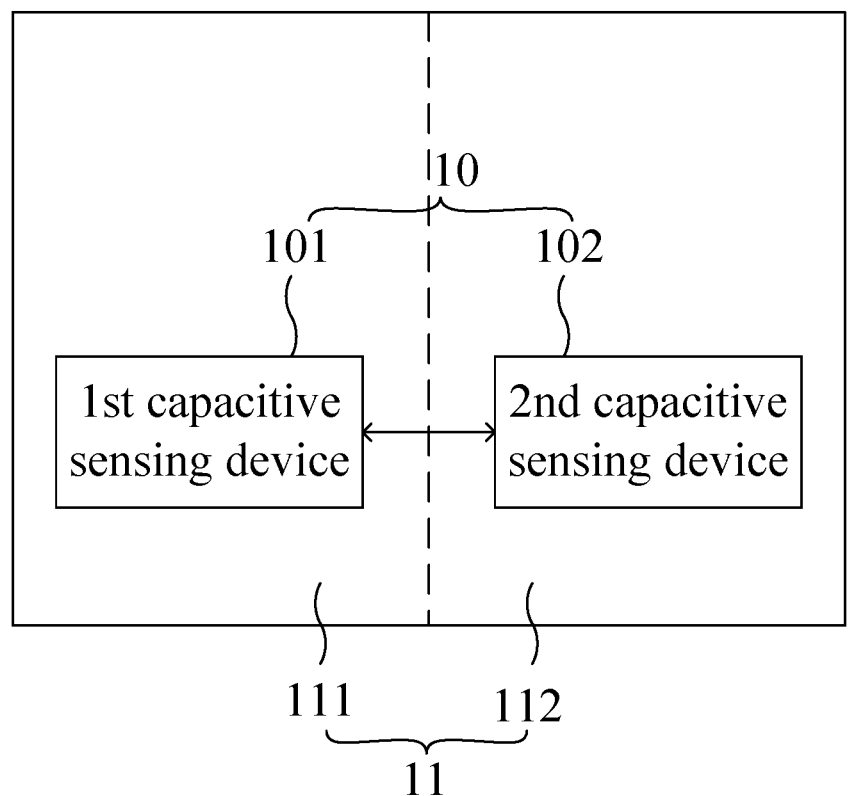
FIG. 1 is a functional block diagram schematically illustrating a capacitive-image sensing system according to an embodiment the present invention.

Referring to FIG. 1, a capacitive-image sensing system 10 is applied to a sensing panel 11. The sensing panel 11 may be, for example, a touch panel, a display panel or a keyboard panel. The capacitive-image sensing system 10 includes a first capacitive sensing device 101 and a second capacitive sensing device 102. The first capacitive sensing device 101 is disposed in a first region 111 of the sensing panel 11, and has a first capacitive sensing characteristic. The second capacitive sensing device 102 is disposed in a second region 112 of the sensing panel 11, and has a second capacitive-image sensing characteristic. The first capacitive-image sensing characteristic is different from the second capacitive-image sensing characteristic. In other words, at least two different capacitive-image sensing characteristics coexist in the same sensing panel 11 for different capacitive image sensing requirements. In this example, the first region 111 and the second region 112 do not overlap. A control circuit (not shown) required for capacitive image sensing may be disposed separately from the first capacitive-image sensing device 101 and the second capacitive-image sensing device 102, or integrated into either of the first capacitive-image sensing device 101 and the second capacitive-image sensing device 102.

In an embodiment, the first capacitive-image sensing characteristic and the second capacitive-image sensing characteristic are a first capacitive-image sensing resolution and a second capacitive-image sensing resolution, respectively. In other words, different resolutions of sensing can be conducted on the same sensing panel for different input functions. Associated application will be described hereinafter with reference to FIGS. 2A-2D.

Figure 2A:
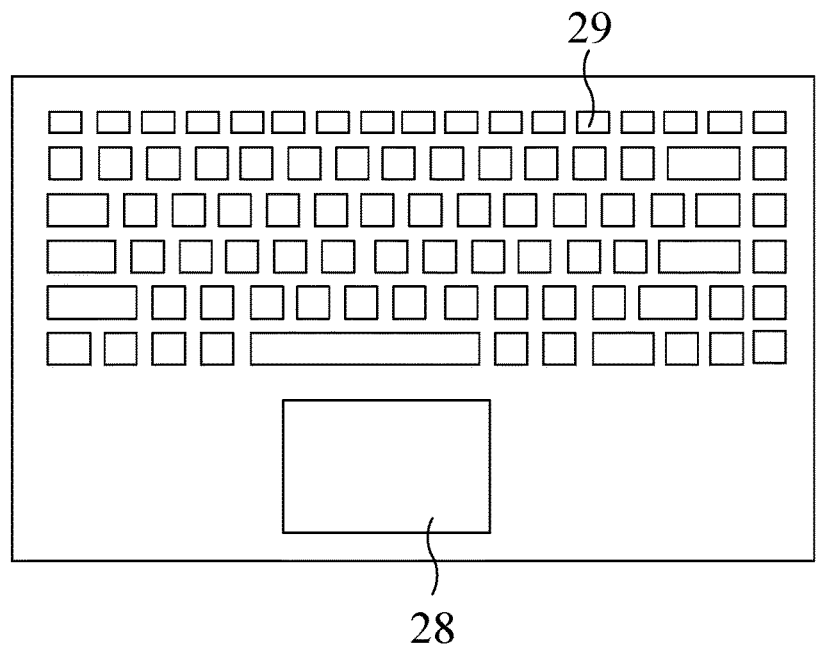
FIG. 2A is a schematic diagram illustrating an exemplified application of the capacitive-image sensing system of FIG. 1.

Please refer to FIG. 2A, in which an exemplified application of the capacitive-image sensing system of FIG. 1 is shown. In this example, the capacitive-image sensing system is a notebook computer, which includes a touch keyboard 29 with a first capacitive-image sensing resolution, and a touch pad 28 with a second capacitive-image sensing resolution. The touch keyboard 29 and the touch pad 28 are both input devices of the notebook computer, and conduct capacitive sensing based on the same sensing electrode structure, e.g. the same one-dimensional electrode structure or the same two-dimensional structure. In the first region where the touch keyboard 29 is disposed, every two adjacent sensing electrodes have a first gap therebetween, and in the second region where the touch pad 28 is disposed, every two adjacent sensing electrodes have a second gap therebetween, wherein the first gap is different from the second gap so as to render different capacitive-image sensing resolutions. The operational principles of touch keys and touch pad can be referred to Taiwanese Patent Publication Nos. 201407430 and 201415334, which are incorporated herein for reference, and will not be redundantly described herein. It is to be noted that the touch sensing control in the keyboard region 111 as described above can be defined according to practical requirements and designs. For example, the touch sensing control may be performed in a two-hand one-finger mode, a two-hand two-finger mode or a two-hand multi-finger mode, wherein the switching among the modes can automatically happen in response to a change of the touching hands and/or fingers relative to the touch keyboard 29. In a particular example, the two-hand one-finger mode is enabled when a common typing behavior is performed to output a key code or repetitive key codes; the two-hand two-finger mode is enabled when a common combinational typing behavior is performed to output a key code together with a functional code such as "shift"; and the two-hand multi-finger mode is enabled when multiple fingers of two hands touch arbitrary keys in the keyboard region at the same time, thereby enabling a tapping operation. It is to be noted that in the two-hand one-finger mode and the two-hand two-finger mode, the key code may be outputted upon pressing the key, or upon releasing the key. In a case that the two-hand multi-finger mode has been enabled, a quick touch of a specified key would output a corresponding key code, but a continuous touch of a specified key would not output repetitive key codes.

Figure 2B:
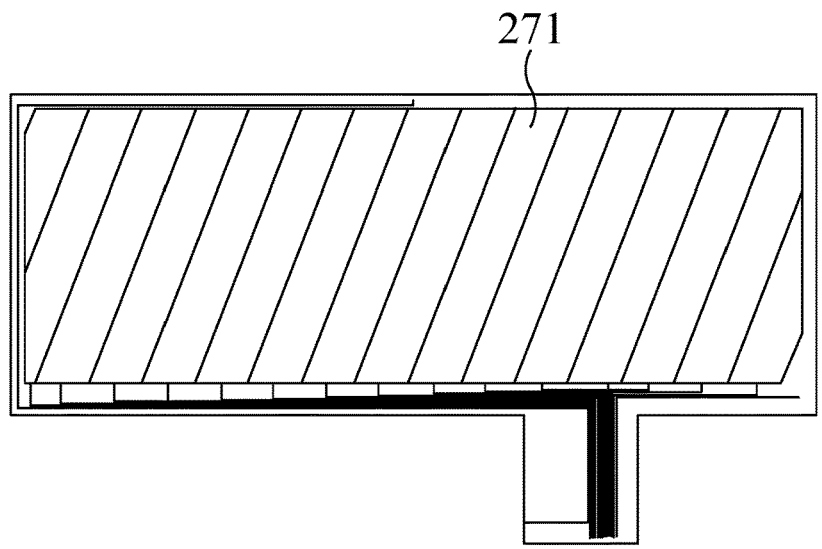
FIGS. 2B-2D are schematic top plane views showing different layers included in a touch key of the capacitive-image sensing system as shown in FIG. 2A.
Figure 2C:
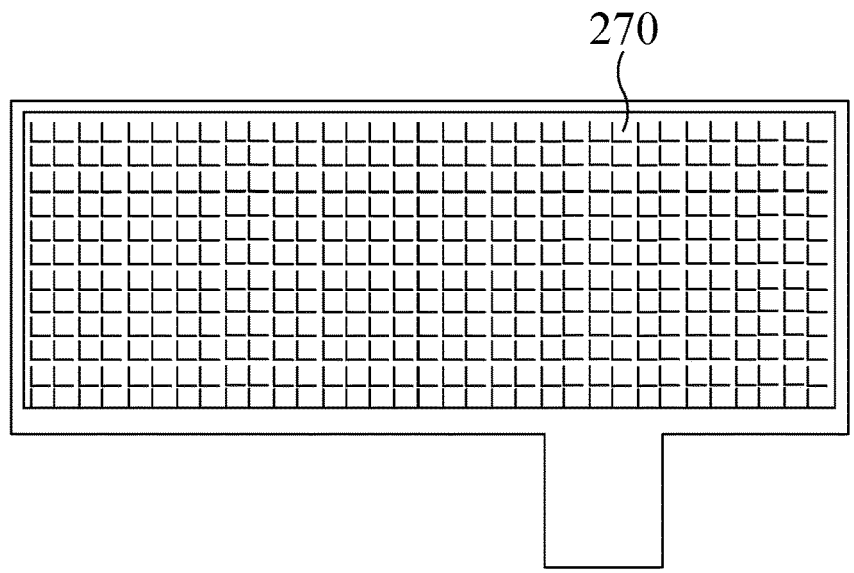
Figure 2D:
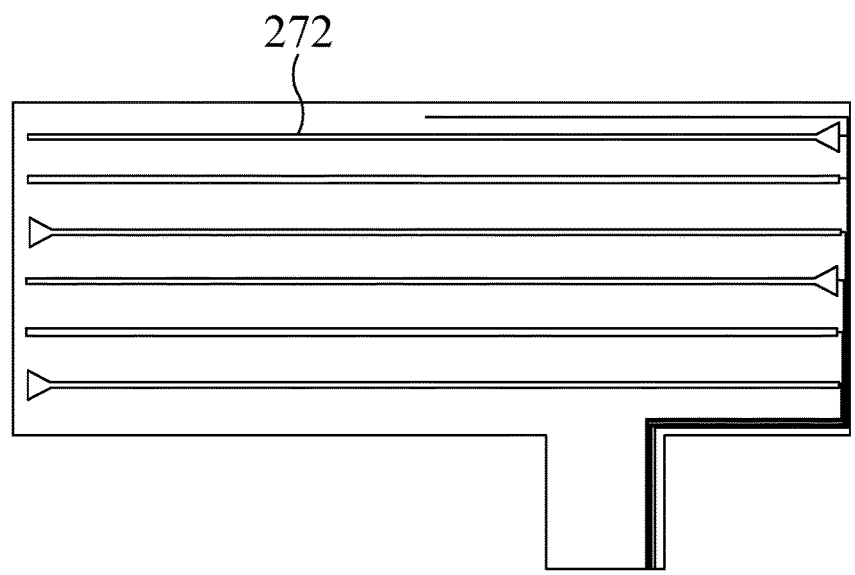

FIGS. 2B-2D schematically illustrate different layers configured for forming the touch keyboard 29 shown in FIG. 2A. In this embodiment, the electrode structure is a two-dimensional double-layer electrode structure. FIG. 2B shows an exemplified layout of a first one of the two electrode layers. In the first layer, a plurality of parallel stripes of electrodes 271 are formed, each slantingly configured for defining keys of the keyboard 29 of the notebook computer. FIG. 2C schematically illustrates an insulating layer 270 disposed between the two electrode layers. The grid pattern represents flexible bumps existing in the insulating layer 270, which function for providing tactile sensation when any of the keys deforms in response to a user's depressing operation. FIG. 2D shows an exemplified layout of a second one of the two electrode layers. In the second layer, a plurality of parallel stripes of electrodes 272 are formed, each intersecting with the plurality of parallel stripes of electrodes 271. Where one of the electrodes 271 and one of the electrodes 272 intersect with each other defines one of the keys of the keyboard 29. By changing the width of the electrodes 272, the area of the keys can be changed. For example, as illustrated in FIG. 2D, the upmost row of keys have smaller area than next row of keys because the upmost stripe of electrode 272 is narrower than next row of keys.

In another example of the embodiment of capacitive-image sensing system as illustrated in FIG. 1, the first capacitive-image sensing device 101 is a touch panel with a first capacitive-image sensing resolution, and the second capacitive-image sensing device 102 is a fingerprint detector with a second capacitive-image sensing resolution. The region 112 of the second capacitive-image sensing device 102 can be made smaller than the region 111 of the first capacitive-image sensing device 101, and disposed at a corner of the sensing panel 11 or surrounded by the region 111, according to practical requirements and designs. In this example, it is necessary that the fingerprint detector has a higher resolution than the touch panel. Therefore, for example, the fingerprint detector may be formed with a microlithographic process used to define the small-size electrodes and wirings. The relatively small wiring structure of the touch panel may also be formed in the same microlithographic process. On the other hand, the relatively large electrode structure of the touch panel may be formed in a separate printing process. Preferably but not necessarily, the electric connection of the wiring structure and the electrode structure are conducted while printing the electrode structure.

In another embodiment, the first capacitive-image sensing characteristic and the second capacitive-image sensing characteristic are a first capacitive-image sensing distance from a touch plane and a second capacitive-image sensing distance from the touch plane, respectively. In other words, the first capacitive sensing device 101 and the second capacitive sensing device 102 are disposed at different levels for different input functions. More particularly, the first region 111 where the first capacitive sensing device 101 is distributed and the second region 112 where the second capacitive sensing device 102 is distributed partially or entirely overlap with each other. If the first capacitive sensing device 101 is a sensing device with a longer sensing distance but a lower scan speed, and works with relatively low power consumption, and the second capacitive sensing device 102 is a sensing device with a shorter sensing distance but a higher scan speed, and works with a relatively high power consumption, the second capacitive sensing device 102 may be switched off to save power when the system is in a standby state, and then switched on in response to a sensing operation of the second capacitive sensing device 102.

In an example, the first capacitive sensing device 101 is a gesture sensor with a first capacitive-image sensing distance from the touch plane, and the second capacitive-image sensing device 102 is a fingerprint detector with a second capacitive-image sensing distance from the touch plane, wherein the first capacitive-image sensing distance is greater than the second capacitive-image sensing distance. In other words, the fingerprint detector is disposed above the gesture sensor for better clarity of the fingerprint image. Taiwanese Patent Publication No. 201443754 teaches a fingerprint sensing technique, which is incorporated herein for reference. In the fingerprint sensing technique, a matrix of characteristic values, e.g. positive or negative signs, are obtained according to the convex-concave distribution of the fingerprint, and thus the matrix of characteristic values can reveal the specificity of the fingerprint, and can be used for fingerprint detection. By incorporating a user's password into the matrix of characteristic values, a pattern like a matrix barcode can be created so as to further specialize the fingerprint identification. This technique can be applied to a portable device to serve as a certifying tool for electronic payment.

When the capacitive-image sensing enters a standby state, the fingerprint detector that consumes power due to high resolution and high scan rate sensing operations is switched off. Once the lower gesture sensor detects a specific gesture in the standby state, the fingerprint detector is switched on for sensing operations. In this way, the redundant sensing operations of the fingerprint detector can be avoided so as to save power. Furthermore, the first capacitive sensing device 101 and the second capacitive sensing device 102 may be driven with different working voltages in response to the differences in sensing distances and/or sensitivities.

Figure 3A:
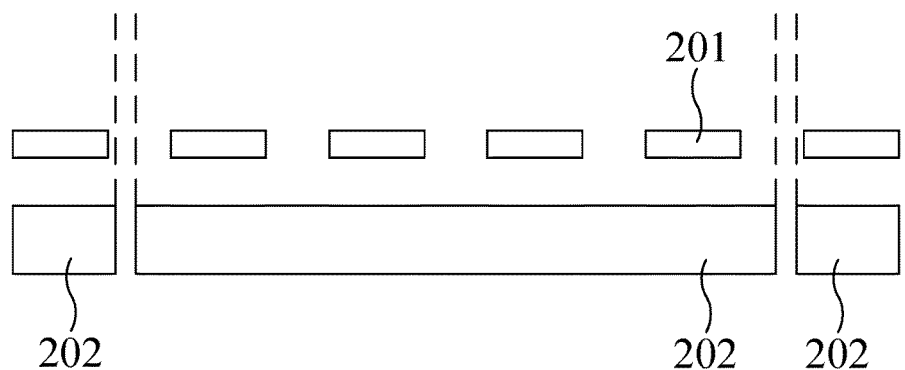
FIGS. 3A and 3B are schematic cross-sectional and top views of a capacitive-image sensing system according to another embodiment the present invention.
Figure 3B:
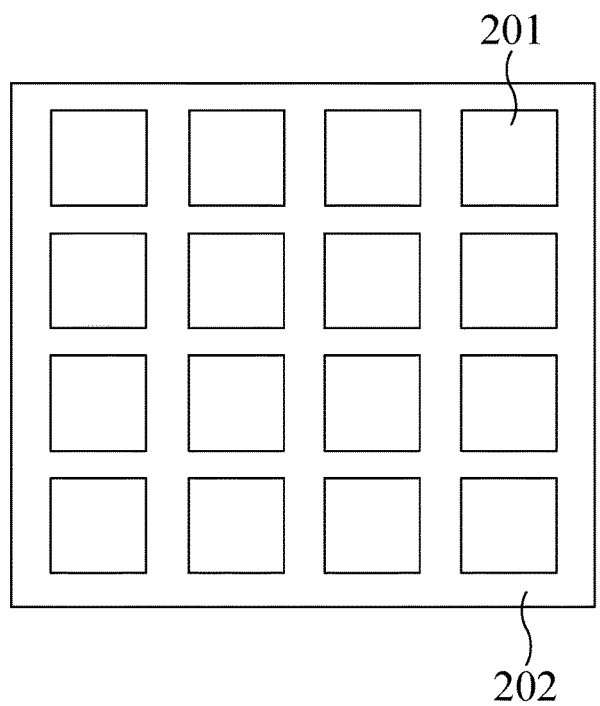

Refer to FIGS. 3A and 3B, which schematically exemplify the layers included in the capacitive-image sensing system as described above. In this embodiment, the electrode structure is a one-dimensional single-layer electrode structure. A plurality of electrodes 201 are formed in a first layer and functions for fingerprint sensing, and a plurality of electrodes 202 are formed in a second layer and functions for gesture sensing. As shown, compared with the lower electrodes 202, the upper electrodes 201 have smaller electrode width. In order not to affect the sensing operation of the lower gesture sensor, the electrodes of the upper fingerprint detector are made floating when the fingerprint detector is switched off. Alternatively, a two-dimensional double-layer electrode structure may also be applied hereto. Furthermore, by allocating each of the electrodes 201 within the area of the electrodes 202 with no electrode 201 crossing a gap between adjacent electrodes 202 (see dashed lines), the sensing operation of the lower gesture sensor can be prevented from the interference of the electrodes 201.

Figure 4:
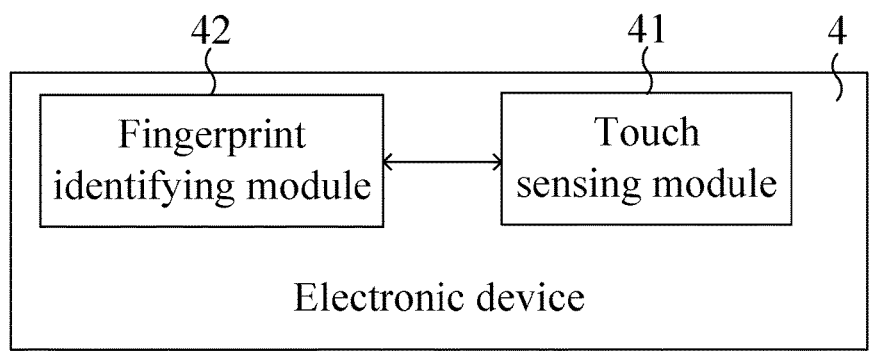
FIG. 4 is a functional block diagram schematically illustrating another exemplified application of the capacitive-image sensing system of FIG. 1.

FIG. 4 schematically illustrates another exemplified application of the capacitive-image sensing system of FIG. 1. The capacitive-image sensing system is an electronic device 4 exhibiting fingerprint identifying and touch sensing functions. The electronic device 4 includes a touch sensing module 41 and a fingerprint identifying module 42. The touch sensing module 41 may be implemented by any currently available sensing techniques, and desirably capacitive touch sensing techniques, for detecting user's touch or gesture. In a specific embodiment, the touch sensing module 41 is disposed near or overlap with the fingerprint identifying module 42 as illustrated above with reference to FIGS. 3A and 3B. When the touch sensing module 41 senses a user's finger approaching the fingerprint identifying module 42 to a certain extent, the fingerprint identifying module 42 is activated to execute the fingerprint identifying task. In this way, only the low power-consuming touch sensing module 41 needs to be kept on, while the high power-consuming fingerprint identifying module 42 need not be switched on until a fingerprint identifying task is commanded, thereby saving power consumption. It is particularly advantageous when the electronic device 4 is a portable device that has limited power supply. The fingerprint identifying module 42 in this embodiment is a capacitive-image sensing device. The touch sensing module 41 and the fingerprint identifying module 42 can be wrapped with an opaque material. In other embodiments, the fingerprint identifying module 42 may also be implemented by optical identifying techniques. In this case, the wrapping material is preferably transparent. Nevertheless, an opaque wrapping material may also be used for optical identification as long as the wrapping material is thin enough to allow the permeation of sensing light, e.g. visible light, IR ray, or UV ray, through the touch plane. Furthermore, the fingerprint identifying module 42 may be distributed all over the display panel, but divisionally activated. In other words, only an area of the fingerprint identifying module 42 where a user's finger approaches will be activated, while the other area is kept off to save power.

Figure 5:
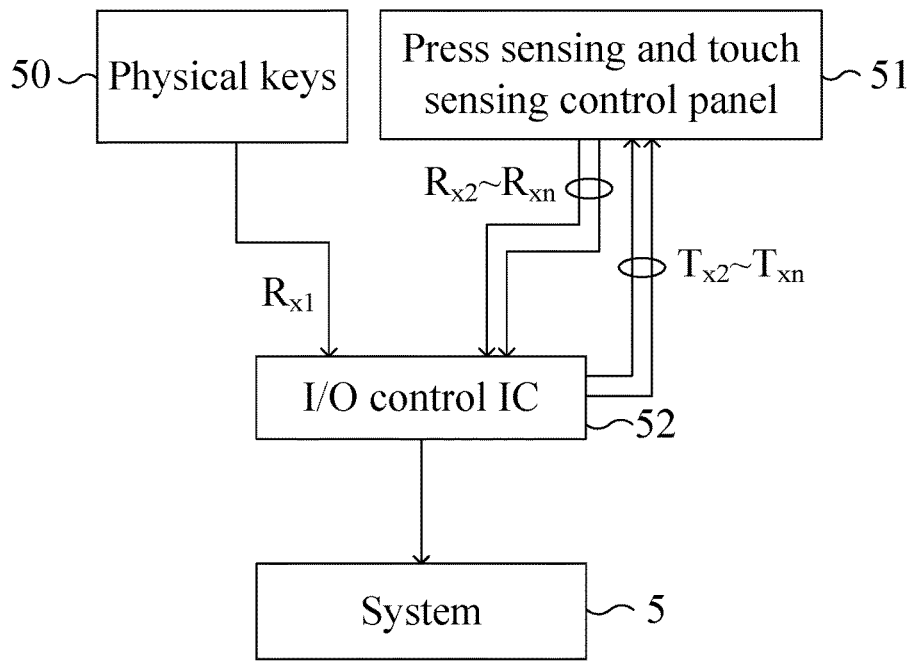
FIG. 5 is a functional block diagram schematically illustrating a further exemplified application of the capacitive-image sensing system of FIG. 1.

FIG. 5 schematically illustrates a further exemplified application of the capacitive-image sensing system of FIG. 1. The capacitive-image sensing system includes physical keys 50 together with a touch panel 51, both being controlled by the same input/output control integrated circuit (I/O control IC). When a user presses any of the physical keys 50 for an awaking or unlocking purpose, the I/O control IC 52 receives 0 voltage via a signal receiving end $R_{x1}$ since the signal receiving end $R_{x1}$ is grounded as a result of the depression of the key. Meanwhile, the I/O control IC 52 is transitorily activated to start a scanning operation of a capacitive image on the touch panel 51 with signal transmission terminals $T_{x2} \sim T_{xn}$ and signal receiving terminals $R_{x2} \sim R_{xn}$. Afterwards, when an awaking and/or unlocking condition is complied with, e.g. a specific touch or gesture is sensed or a specific fingerprint pattern or characteristic is detected within a predetermined period of time, the I/O control IC 52 then activates the entire system 5. Otherwise, the system returns to the sleep state and waits for next depression on any of the physical keys 50. In this way, the system 5 and the I/O control IC 52 do not have to be kept on, and power consumption can be minimized.

Figure 6:
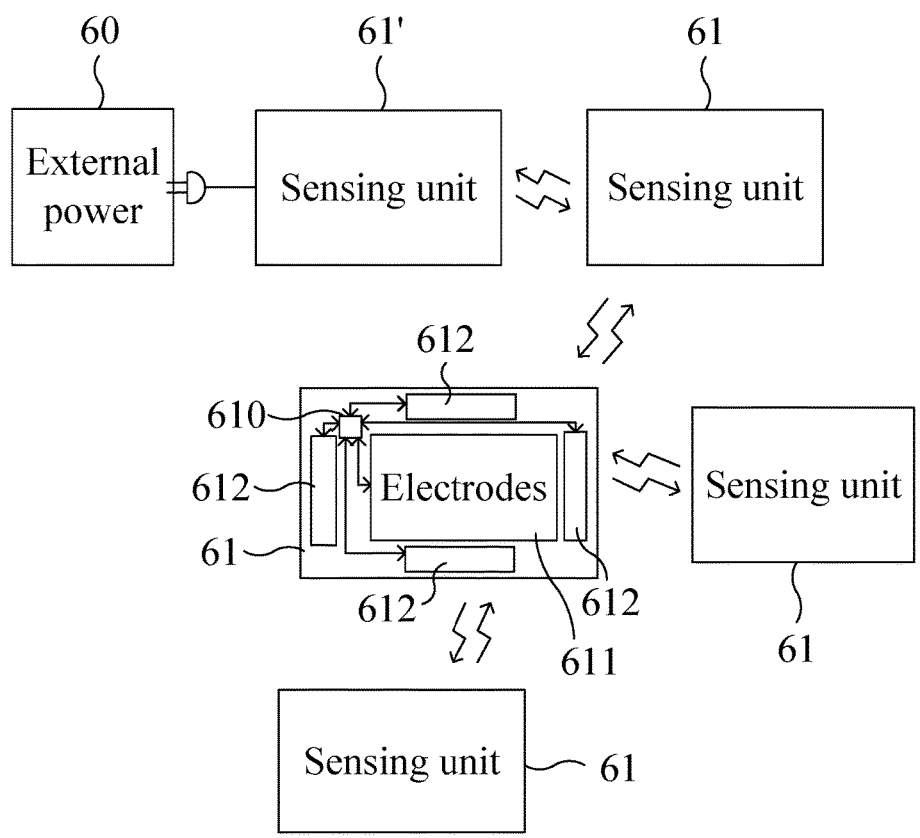
FIG. 6 is a functional block diagram schematically illustrating another further exemplified application of the capacitive-image sensing system of FIG. 1.

Refer to FIG. 6, in which another further exemplified application of the capacitive-image sensing system of FIG. 1 is schematically illustrated. The capacitive-image sensing system includes a plurality of identically structured sensing units 61, wherein one of the sensing units, as labelled with a numeral reference 61', is electrically connected to an external power 60 or battery for introducing power into the sensing unit network. Preferably, the sensing units 61 are configured and combined in a tiling manner. Each of the sensing units 61 includes a thin film and a single layer of electrodes overlying the thin film. The single layer of electrodes include a touch sensing electrode portion 611 and a near-field signal and power transmission electrode portion 612. The touch sensing electrode portion 611 forming an upper surface of the sensing unit 611 and covered by a waterproof protection material (not shown). The near-field signal and power transmission electrode portion 612 is disposed at a margin of the sensing unit 61, and also covered by the waterproof material. Via respective near-field signal and power transmission electrode portions 612 of adjacent sensing units 61, which are close to each other after tiling, signal and power transmission between adjacent sensing units 61 can be conducted. Furthermore, the touch sensing electrode portion 611 and the near-field signal and power transmission electrode portion 612 are electrically connected to a control chip 610. Under the control of the control chip 610, touch sensing control can be conducted by the touch sensing electrode portion 611 in response to a user's touch or gesture with his finger, palm or sole. The control chip 610 is preferably a transmission control chip complying with a wireless network protocol, e.g. ZigBee, for low-speed short-distance transmission. The near-field signal and power transmission electrode portion 612 can be used as a transmission antenna for wireless recharging and/or wireless signal transmission. By way of the wireless network protocol, the touch sensing result of one or more of the sensing units 61 can be wirelessly transmitted to an external system (not shown). In this way, the plurality of sensing units 61 may be combined to define a larger area touch sensing panel or tiled to form a touch sensing ground. The sensing units 61, for example, may be gesture sensors or fingerprint detectors.

Figure 7:
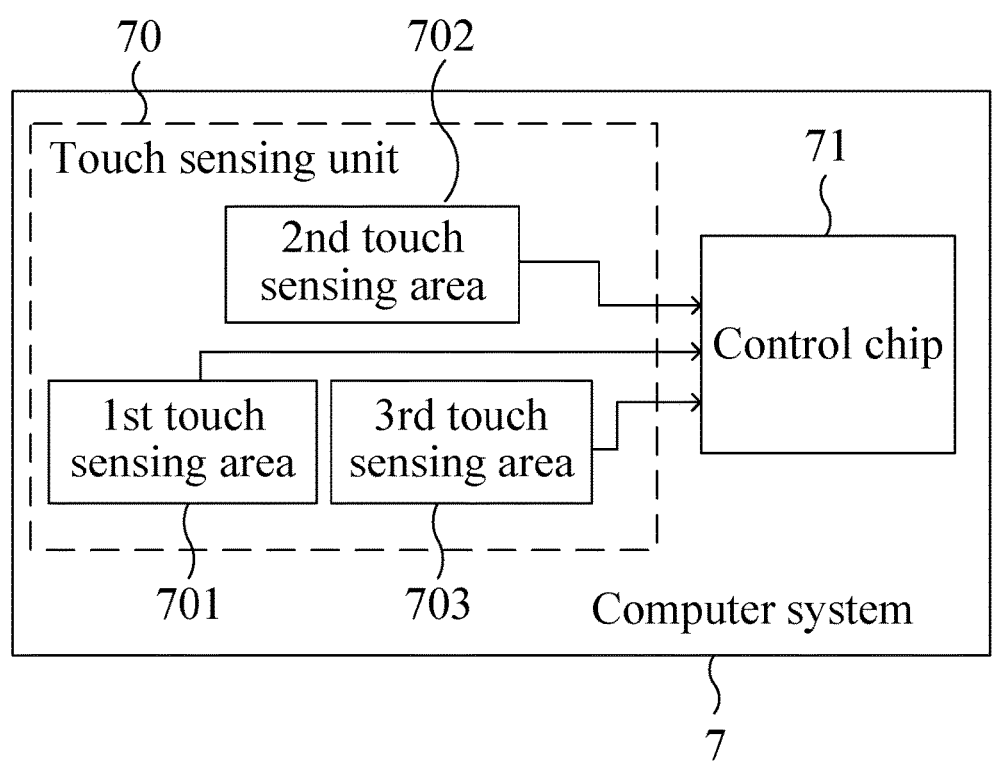
FIG. 7 is a functional block diagram schematically illustrating a capacitive-image sensing system according to another embodiment the present invention.

Please refer to FIG. 7, which schematically illustrates a capacitive-image sensing system according to another embodiment of the present invention. In this embodiment, the capacitive-image sensing system is a computer system of a tablet computer or a smart display panel as described in U.S. patent application Ser. No. 14/516,948, which is assigned to the same assignee as the present application. As shown, the computer system 7 includes a touch sensing unit 70 and a control chip 71 serving as a user interface. For saving power consumption, the standby computer system 7 itself enters a power-saving mode, e.g. sleep mode. Meanwhile, only the user interface, i.e. the control chip 71 and the touch sensing unit 70, is in a normal working state. Therefore, the awaking and/or unlocking of the computer system 7 are executed by the user interface. For example, when the user interface detects a specific gesture or a specific code, the computer system 7 is awaked or unlocked to enter a normal working state. Furthermore, even when the computer system 7 has been in a normal working state, the computer system does not need to always stay in the input signal receiving state. Instead, the computer system may restore to the normal working state after the user interface detects a user's touch or gesture or key depression and informs the computer system 7. For example, when the user is operating an online communication software, e.g. WeChat or LINE, on a tablet computer or a smart display panel, the computer system 7 of the tablet computer or a smart display panel enters a sleep mode to save power during message input. The input message can be displayed by way of a On Screen Display function of the control chip 71. The control chip 71 also receives and stores the message inputted by the user through the user interface, and transmits the stored message to the backend computer system 7 after a transmission condition is complied with. Meanwhile, the control chip 71 awakes the computer system 7 to link to the internet to send out the message. The transmission condition mentioned above may be the depression of the ENTER key, or the detection of a specific gesture. It is understood that the computer system may also be other kinds of information processing system, e.g. smart phone.

Furthermore, the touch sensing unit 70 may include more than one touch sensing area, which independently operate for touch sensing. In the embodiment as shown in FIG. 7, a first touch sensing area 701, a second touch sensing area 702 and a third touch sensing area 703 are included. In an example, the first touch sensing area 701 serves as a touch keyboard, the second touch sensing area 702 serves as a fingerprint detector, and the third touch sensing area 703 serves as a touch sensing edge. The first touch sensing area 701, second touch sensing area 702 and third touch sensing area 703 may be formed with the same electrode structure or different electrode structures, but are all electrically connected to the control chip 71. The three area may independently enter a sleep mode to execute low-speed scan for saving power. Once a user's finger touch any of the touch sensing area, that touch sensing area restores to a high-speed scan state. Therefore, touch sensing can be applied to a large-size display without worrying large power consumption. The above-mentioned touch sensing edge may be formed by attaching sensing electrodes on the frame of the display other than on the display panel. The On Screen Display function of the control chip 71 may show corresponding icons on the display panel for facilitating the user's operations. The touch sensing areas, for example, may serve as gesture sensors or fingerprint detectors.

The foregoing descriptions, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention. While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A capacitive-image sensing system for use in an information processing system, the information processing system comprising a specified sensing panel, and the capacitive-image sensing system comprising:
   a first capacitive sensing device disposed in a first region of the specified sensing panel for conducting a first capacitive sensing function; and
   a second capacitive sensing device disposed in a second region of the specified sensing panel for conducting a second sensing function,
   wherein the second region overlaps the first region, and the first capacitive sensing function is performed in response to a user's operation in the overlapping area when the system is in a first state, while the second capacitive sensing function is performed in response to a touch or gesture operation in the overlapping area when the system is in a second state.

2. The capacitive-image sensing system according to claim 1, wherein the first capacitive sensing device has a lower capacitive-image sensing resolution than the second capacitive sensing device in the overlapping area.

3. The capacitive-image sensing system according to claim 2, wherein the first capacitive sensing device is disposed under the second capacitive sensing device in the overlapping area.

4. The capacitive-image sensing system according to claim 1, wherein the first capacitive sensing device is disposed under the second capacitive sensing device in the overlapping area.

5. The capacitive-image sensing system according to claim 4, wherein the first capacitive sensing device includes a plurality of first electrodes separate from each other with a gap, the second capacitive sensing device includes a plurality of second electrodes, and none of the second electrodes in the overlapping area crosses the gap between any two of the first electrodes.

6. The capacitive-image sensing system according to claim 1, wherein the first capacitive sensing device is kept in a normal working state, and the second capacitive sensing device is switched from an OFF state into an ON state in response to a specific sensing operation detected by the first capacitive sensing device.

7. The capacitive-image sensing system according to claim 6, wherein the first capacitive sensing device and the first capacitive sensing function are a gesture sensor and a touch-sensing function, respectively, and the second capacitive sensing device and the second capacitive sensing function are a fingerprint detector and a fingerprint sensing function, respectively.

8. The capacitive-image sensing system according to claim 6, wherein the second capacitive sensing device is a fingerprint detector set consisting of a plurality of fingerprint detectors, and the capacitive-image sensing system further comprises a control chip in communication with the fingerprint detectors, wherein the fingerprint detectors are independently activated by the control chip according to a user's touch position on the fingerprint detectors.

9. The capacitive-image sensing system according to claim 6, wherein electrodes of the second capacitive sensing device are made floating in the first state of the system.

10. The capacitive-image sensing system according to claim 1, wherein the first capacitive sensing device is driven with a first working voltage, and the second capacitive sensing device is driven with a second working voltage, which is unequal to the first working voltage.

11. The capacitive-image sensing system according to claim 1, wherein the sensing panel is a touch pad, a touch panel or a touch keyboard.

12. The capacitive-image sensing system according to claim 1, further comprising at least one physical key, wherein the first capacitive sensing device is temporarily activated to execute the first touch sensing function in response to depression of the at least one physical key, and the entire capacitive-image sensing system, the sensing panel and/or the information processing system is activated in response to a specific touch sensing result.

13. The capacitive-image sensing system according to claim 1, wherein the first capacitive sensing device is a gesture sensor, and the capacitive-image sensing system further comprises a control chip in communication with the gesture sensor, and wherein the control chip controls the information processing system to switch from a sleep mode to a normal working mode in response to a gesture detected by the gesture sensor.

14. The capacitive-image sensing system according to claim 13, wherein a message inputted by a user when the information processing system is in a sleep mode is received and stored by the control chip, and the control chip activates the information processing system to switch from the sleep mode to the normal working mode and transmits the message to the information processing system when a transmission condition is complied with.

15. The capacitive-image sensing system according to claim 13, wherein it is determined that the transmission condition is complied with when the gesture sensor detects a specific gesture.

16. The capacitive-image sensing system according to claim 13, wherein the capacitive-image sensing system further comprises additional gesture sensors, and each of the gesture sensors includes a touch sensing electrode portion for sensing a user's touch or gesture, and a near-field signal and power transmission electrode portion disposed at an edge thereof, wherein the gesture sensors execute signal transmission therebetween via respective near-field signal and power transmission electrode portions.

17. A capacitive-image sensing system for use in an information processing system, the information processing system comprising a specified sensing panel, the specified sensing panel having a touch-sensing surface where a touch or gesture is performed, and the capacitive-image sensing system comprising:
a first capacitive sensing device disposed a first distance from the touch-sensing surface for conducting a first capacitive sensing function; and
a second capacitive sensing device disposed a second distance from the touch-sensing surface for conducting a second sensing function,
wherein the first distance is greater than the second distance.

18. The capacitive-image sensing system according to claim 17, wherein the first capacitive sensing device has a lower capacitive-image sensing resolution than the second capacitive sensing device.

19. The capacitive-image sensing system according to claim 17, wherein the first capacitive sensing device is disposed under and has an overlapping area with the second capacitive sensing device, and wherein the first capacitive sensing function is performed in response to a touch or gesture operation in the overlapping area when the system is in a first state, while the second capacitive sensing function is performed in response to a user's operation in the overlapping area when the system is in a second state.

20. The capacitive-image sensing system according to claim 19, wherein the first capacitive sensing device includes a plurality of first electrodes separate from each other with a gap, the second capacitive sensing device includes a plurality of second electrodes, and none of the second electrodes in the overlapping area crosses the gap between any two of the first electrodes.

21. The capacitive-image sensing system according to claim 17, wherein the first capacitive sensing device is kept in a normal working state, and the second capacitive sensing device is switched from an OFF state into an ON state in response to a specific sensing operation detected by the first capacitive sensing device.

* * * * *